97284

Cleaveland F. Dunderdale.
Apparatus for Sifting & Carburetting Air, and Mixing it with Hydrogen, pure & Carburetted.

PATENTED NOV. 30. 1869.

Witnesses:
J. S. Watson
A. Eitenberg

Inventor.
Cleaveland F. Dunderdale

United States Patent Office.

CLEAVELAND F. DUNDERDALE, OF NEW YORK, N. Y.

IMPROVED APPARATUS FOR PRODUCING ILLUMINATING-GAS.

Specification forming part of Letters Patent No. 97,284, dated November 30, 1869.

*To all whom it may concern:*

Be it known that I, CLEAVELAND F. DUNDERDALE, of the city, county, and State of New York, have invented a new and useful and Improved Mode of Forming and Producing Illuminating-Gas; and I do hereby declare that the following is a full, clear, and exact description of the same.

The nature of my invention has for its object the forming of illuminating-gas by carbureting atmospheric air and hydrogen separately, and mixing them together in a proper device for the purpose, or mixing hydrogen gas with air that has already been carbureted in the proper proportions, for preventing condensation in the pipes by the excess of hydrocarbon vapor that may be carried over in the carbureting process. I use a device for forcing air and carbureting it at the same time, in combination with a hydrogen generator and carbureter like that patented to me in Letters Patent No. 90,644, dated June 1, 1869.

It consists in the construction and combination of the various parts of the apparatus and the application thereof, as hereinafter more fully described.

To enable others skilled in the art to make and use my invention, I shall proceed to describe its construction and operation.

The drawings referred to are annexed and form part of this specification.

Similar letters of reference indicate corresponding parts.

Figure 1:
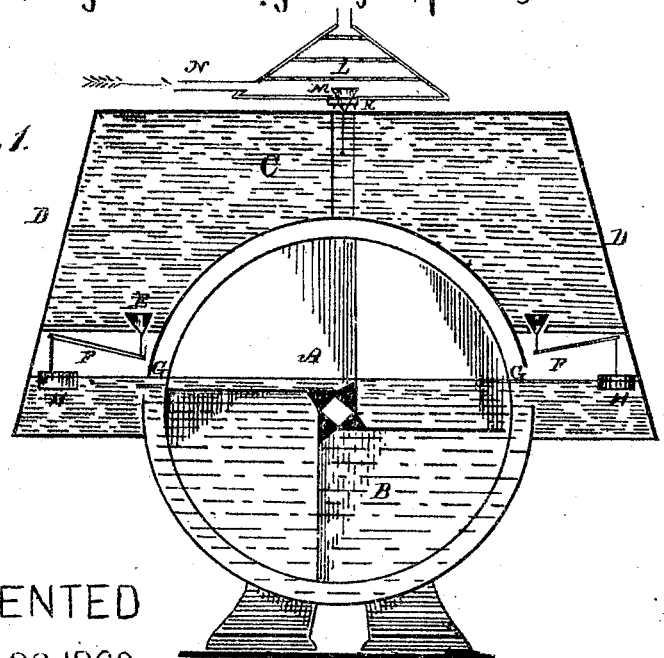
Figure 2:
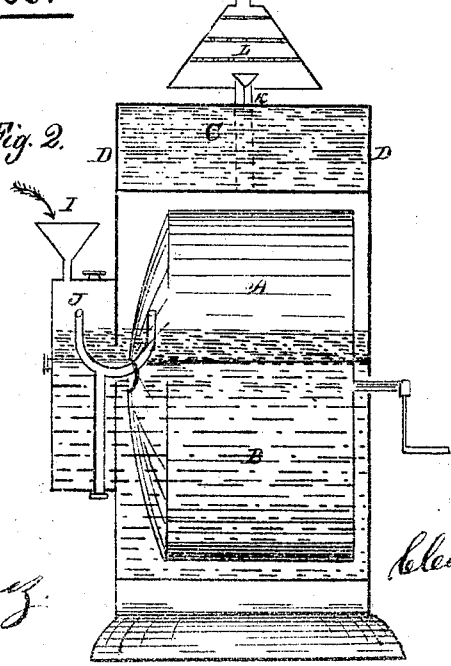

Figure 1 shows a sectional view of a common wet gas-meter or an air-blowing wheel constructed on the same principles, with my carbureting device attached thereto. Fig. 2 shows a transverse sectional view of the same.

A in the drawings shows the air-blowing wheel (when used for that purpose) of a wet gas-meter, partly immersed in water. (Shown by the coarse shading B.)

The fine shading C represents a hydrocarbon liquid contained in a reservoir or tank, D, attached to the top part of the meter, which passes through the valves E into the chamber F, where it floats on top of the water through the compartments of the screw-wheel through holes or openings G, the quantity or depth of which is regulated in an automatic manner by floats H and valves E. The air enters into the screw-wheel through pipe J, (shown in Fig. 2,) and, passing through, it mixes with the vapors of the hydrocarbon liquid washed about by the motions of the wheel as it revolves, thereby becoming carbureted, is forced out through pipe K into the compartment L, through valve M, there mixing with the hydrogen, carbureted or otherwise, entering through pipe N, passes up through the sieves or perforated metal partitions contained in L, is thereby thoroughly mixed with it, and passes into the pipes of the building.

For generating and carbureting the hydrogen I use a suitable apparatus for the purpose, similar to that referred to as patented to me.

The temperature of the water in the meter or air-blowing wheel can be kept up in winter weather by heating said water by proper means.

The mixing of the carbureted air and the hydrogen forms an economical gas, and the presence of the hydrogen in the mixture prevents in a great measure condensation of the vapor of the hydrocarbon fluid.

Having thus described my invention, what I claim as new and useful, and desire to secure by Letters Patent, is—

1. The combination of a blowing-wheel, wet gas-meter, or a similar device for forcing air and carbureting it at the same time with a reservoir attached to supply a given quantity automatically of hydrocarbon liquid, as herein described and shown.

2. The combination of reservoir C, valves E, floats H, mixer L, valve M, compartment F, holes G, sifter I, strata of hydrocarbon liquid floating on surface of water with each other and with a wet gas-meter or air-blowing wheel of similar device, substantially as herein shown and described, and for the purposes set forth.

CLEAVELAND F. DUNDERDALE.

Witnesses:
J. S. WATSON,
A. EITENBEUZ.